UNITED STATES PATENT OFFICE.

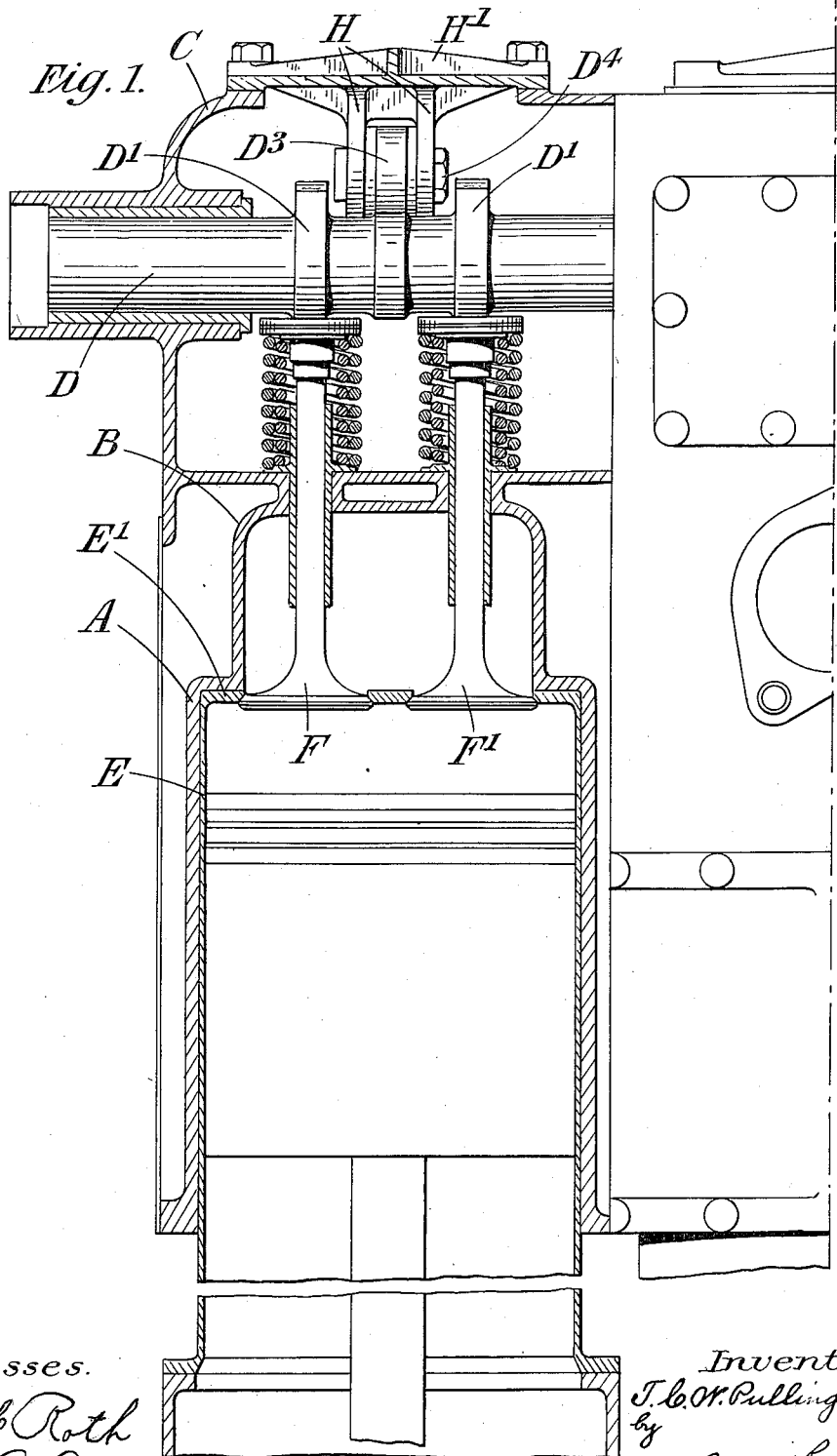

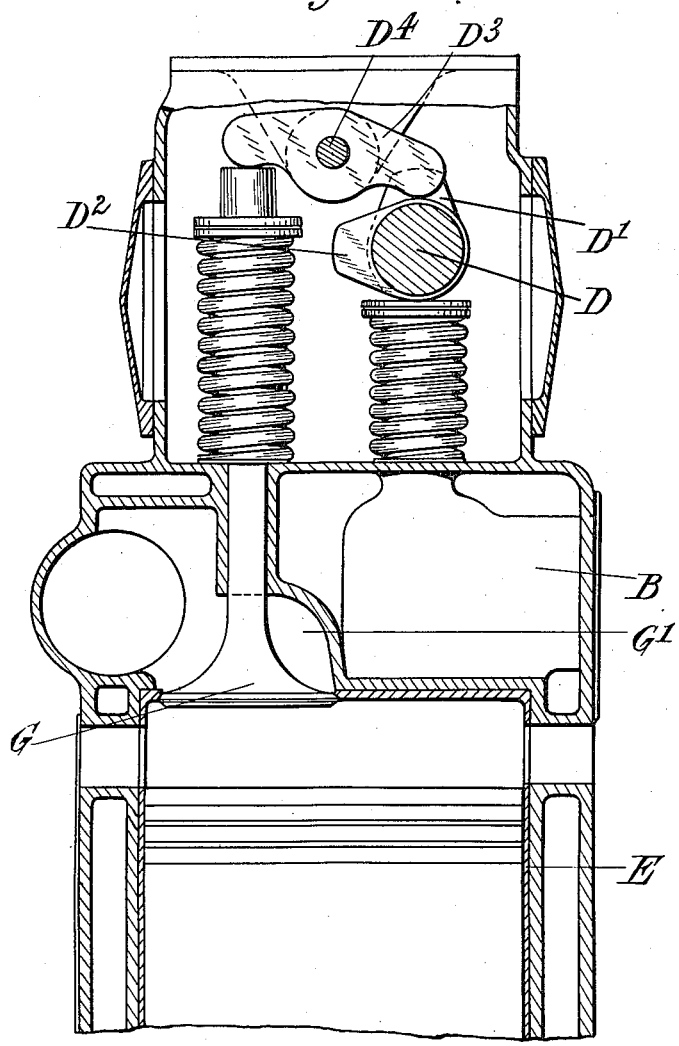

THOMAS CHARLES WILLIS PULLINGER, OF THE BRAE, NEAR DUMFRIES, SCOTLAND, ASSIGNOR, BY DIRECT AND MESNE ASSIGNMENTS, TO AMERICAN B. H. P. AERO ENGINE CORPORATION, OF NEW YORK, N. Y., A CORPORATION OF NEW YORK.

VALVE MECHANISM AND ASSOCIATED PARTS OF INTERNAL-COMBUSTION ENGINES.

1,271,764. Specification of Letters Patent. Patented July 9, 1918.

Application filed September 5, 1916. Serial No. 118,331.

*To all whom it may concern:*

Be it known that I, THOMAS CHARLES WILLIS PULLINGER, a subject of the King of England, residing at The Brae, near Dumfries, Scotland, have invented certain new and useful Improvements in Valve Mechanism and Associated Parts of Internal-Combustion Engines, of which the following is a specification.

This invention is for improvements in or relating to the valve-mechanism and associated parts of internal combustion engines and has for its main object to provide an arrangement of valves with their operating gear and housing such that the weight and the number of the parts will be reduced to a minimum. The invention is particularly applicable to aeroplane engines where lightness is a great desideratum; the water-jackets of these engines, as is well-known, are commonly cast in aluminium and steel cylinders are secured therein by any convenient means.

The expression "block of cylinders" is herein employed to denote either several cylinders cast in one or a block built up by securing several separate cylinders together.

According to this invention in a multicylinder internal combustion engine there is combined with a block of cylinders a single inlet and two exhaust valves of the mushroom-type mounted in each cylinder head in such manner as to move approximately in the longitudinal direction of the cylinder and a single cam-shaft which extends along the block and has operative connection with all the valves of all the cylinders. The purpose of this arrangement is to provide as large a valve area as possible for each cylinder while reducing the operating parts to a minimum. It is found that by using a single inlet-valve and two exhaust-valves the greatest valve efficiency can be obtained within a given circular area, such as that afforded by the head of a cylinder, so that the parts can be rendered in this manner as compact as possible without losing efficiency. By using two exhaust-valves instead of one large exhaust-valve, not only would there be no loss in compactness, but large valves are found to break, as it is necessary to keep the stem small for the sake of lightness and the constant hammering of the valve then results in fracture of the stem.

Preferably the three valves are arranged to occupy as great a portion of the cross-sectional area of the cylinder-head as possible, the said cylinder-head being moreover made approximately equal in diameter to or less in diameter than that of the cylinder so there is little or no lateral projection of the walls of the cylinder-head beyond the walls of the cylinder.

In the accompanying drawings—

Figure 1 is a vertical section through one cylinder of part of a block of cylinders in the plane of the stems of the exhaust-valves, and Fig. 2 is a central section through the same cylinder at right-angles to the section shown in Fig. 1.

The same letters indicate the same parts throughout the drawings.

The water-jacket A of the block of cylinders is cast in aluminium or other light metal and the valve-chamber B and housing C for the eccentric-shaft D is all cast in one with the water-jacket. Conveniently each casting provides for a block of three cylinders, but as the parts connected with each cylinder are alike it is only necessary to describe those relating to one cylinder.

The cylinder E is of steel and is screwed or otherwise secured in the water-jacket, the steel being continued across the end as at $E^1$ to constitute the head of the cylinder; the head of the cylinder is thus of the same diameter as the cylinder itself and in this head three valves F, $F^1$ and G are mounted. The valves F, $F^1$ constitute the exhaust-valves and control communication between the cylinder and the valve chamber B. These two valves are set as far to one side of the cylinder as possible, and set on a line midway between them, and as far to the other side as possible, is the inlet-valve G. The valve G is larger than either of the valves F, $F^1$ and controls communication between the cylinder and an inlet-valve chamber $G^1$, which is cast in one with the water-jacket and valve chamber B.

The two stems of the exhaust valves F, $F^1$ lie in a vertical plane which is parallel with the vertical plane passing centrally through the cylinders of the whole block, and mounted above the said valve-stems is the eccentric shaft D. This shaft is thus set to one side of the central plane of the block but lies vertically above the valve-stems of all the exhaust valves so that it can operate all of these direct by means of cams, indicated at $D^1$.

The shaft has a cam $D^2$ situated between each pair of cams $D^1$ and this operates one end of a rocking-lever $D^3$ which is pivoted at $D^4$ in a jawed bracket H made integral with a detachable cover-plate $H^1$ on the top of the housing C. The free end of the rocking-lever $D^3$ lies over, and operates upon, the stem of the inlet-valve G. This arrangement is repeated for the valves of all the cylinders in the block and thus the one shaft D operates directly upon the exhaust valves of the block by means of its eccentrics $D^1$ and operates the inlet valve of each cylinder through the medium of the single rocking-levers $D^3$, there being one lever for each cylinder.

The lids $H^1$ constitute an easy means whereby the rocking-lever is quickly removed as one unit with the lid so that access can be had to the valve G and other parts immediately beneath the lid, and the whole arrangement reduces the number of parts to a minimum and secures remarkable compactness while providing ample valve-opening.

It has been found that if two valves are employed instead of three the area for their accommodation must be increased to give the same efficiency as is obtainable by three. The available area for the valves can of course be increased by enlarging the head of the cylinder but this increases the cost of manufacture and also the weight of the engine as well as the space required to accommodate it.

What I claim as my invention and desire to secure by Letters Patent is:—

In an internal combustion engine, the combination of an engine cylinder having at one end a wall providing a circular area wherein seatings for the controlling valves are situated, two exhaust valves of the mushroom type mounted in two seatings provided in the said area, an inlet valve of the mushroom type mounted in a third seating within the said area to one side of and equidistant from each of the exhaust valves, the said inlet valve being larger than each of the exhaust valves and all three valves being of such dimensions that the greatest portage room available is obtained within the said given circular area whereby free passage of the exhaust is provided for as well as adequate portage for the incoming charge, a single cam shaft placed across the two exhaust valves, to operate them directly by cams on the shaft, an outer detachable cover plate situated above the valves and its shaft, and a rocking lever carried by a depending bracket on the cover plate and so situated that one end bears on a third cam on the cam shaft and the other end on the inlet valve which arrangement allows the rocking lever to be readily removed with the cover plate and the free exposure of the other parts for inspection, substantially as set forth.

In testimony whereof I have signed my name to this specification in the presence of two subscribing witnesses.

THOMAS CHARLES WILLIS PULLINGER.

Witnesses:
R. B. NICOL,
W. LOWE.